April 7, 1970 — J. A. PARENTI — 3,504,577
BELT HOLE CUTTER
Filed Sept. 17, 1968
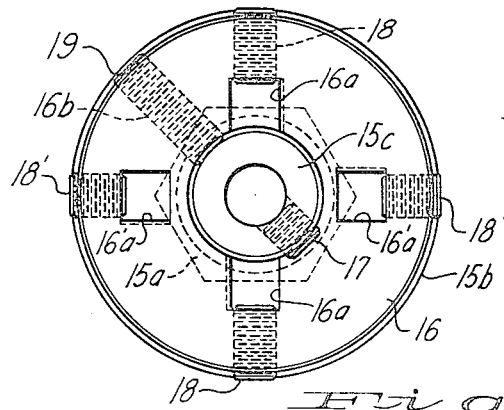
Fig. 2
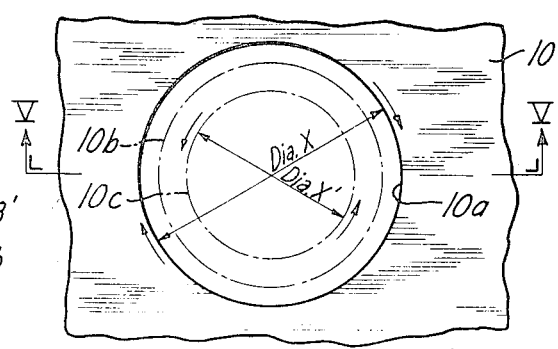
Fig. 4
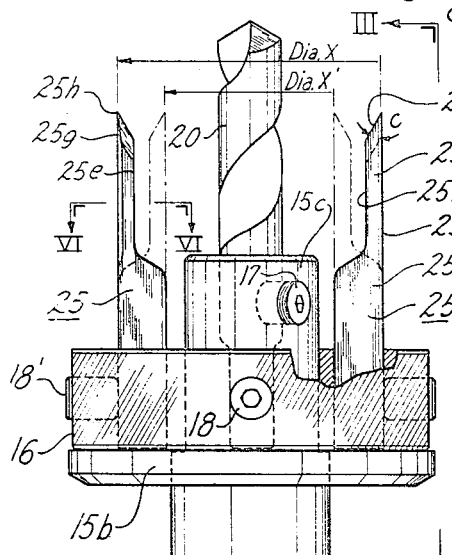
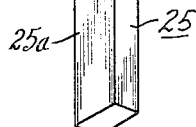
Fig. 7
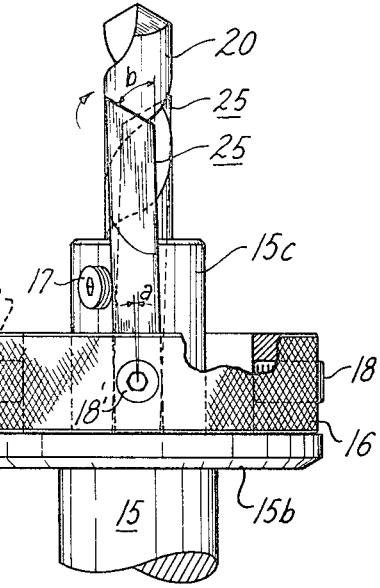
Fig. 3
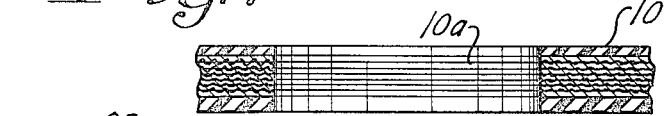
Fig. 5
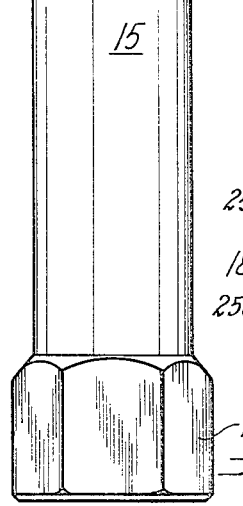
Fig. 6
Fig. 1
INVENTOR
JOSEPH A. PARENTI
BY
Green, McCallister & Miller
HIS ATTORNEYS United States Patent Office 3,504,577
Patented Apr. 7, 1970

3,504,577
BELT HOLE CUTTER
Joseph A. Parenti, Rte. 7, Box 330,
Morgantown, W. Va. 26505
Filed Sept. 17, 1968, Ser. No. 760,176
Int. Cl. B23b 51/04
U.S. Cl. 77—79     5 Claims

ABSTRACT OF THE DISCLOSURE

A rotative hole cutting device for a heavy, somewhat soft, resilient, fabric-like material in the nature of belting is provided with a forwardly-extending drill stem that first enters the material, and with a pair of opposed, especially-constructed and positioned key-like cutter elements that follow the drill stem and quickly and efficiently cut-out a circular hole in the material. The drill stem serves to guide movement of the cutter elements and to retain the part or fragment being cut-out in position until the completion of the operation.

---

The invention relates to accurately cutting-out or forming hole portions in a relatively tough, somewhat resilient, rather heavy fabric material and particularly, to a driven cutting tool or device for quickly cutting-out somewhat closely spaced-apart circular holes in a piece of belting material to enable mounting the piece as a side skirt for use, for example, with continuous coal mining machinery, such as buggies, or tire cars unloading into a tail piece, thus to limit spillage of coal from a conveyor employed therewith.

Although several manufacturers have produced and offered so-called tail pieces for sale to users of continuous belt line systems for transporting coal out of mines, mine owners prefer to make their own from used or discarded (usually resin or rubber-impregnated) fabric-like belting which has been worn to an extent requiring replacement. This used belting is preferred for reasons of lessened expense and out-lasting skirts made of rubber alone; a conveyor belt made type has a much longer wear in usage. For example, a purchased rubber type of skirt for tail pieces may last thirty days, as compared to the three or four months life of a conveyor belt made type. To mount a tail piece on a conveyor or like equipment, it is necessary to cut-out a series of somewhat closely spaced-apart holes therealong to receive clamping assemblies. Tail pieces are mounted at one vertical level on the end of the equipment to prevent coal from spilling-off and when their bottom edges are worn-down, are then dropped a requisite distance to make them effective for continued usage.

It has also been customary to provide three sizes of holes, namely, 2", 1¾" and 1⅜". Difficulty has heretofore been encountered in cutting such holes in view of the nature of the belting material. Exemplary pieces of such material may have about five layers of resin or rubber impregnated nylon fabric with thickened resin or rubber top and bottom layers. The resilient or somewhat flexible nature of the material tends to cause an uneven cut and to set up excessive resistance-generated heat, such that cutters or saws tend to run hot. A circular saw will burn up, due to the fact that there is too much friction, while a single conventional cutter, such as used with wood, results in an off-center or eccentric cutting action due to a periodic holding and releasing of the cutter by the resilient material.

It has thus been an object of the invention to devise a novel cutting tool or device and cutter elements therefor which will eliminate the difficulties hereto encountered in providing holes in a fabric-like material such as belting;

Another object has been to provide a cutting tool or device having a preliminarily insertable element for aligning the tool, accurately guiding it in its cutting action, and retaining the part being cut in position until the operation is completed;

Another object of the invention has been to devise key-like cutting elements for a hole cutting tool which will be effective and efficient in cutting a circular part or piece out of a heavy somewhat resilient fabric material such as belting.

A still further object of the invention has been to provide a circular hole cutting tool or device that can be connected to a rotating motor means, such as an impactor, for quickly and effectively cutting out holes in a somewhat heavy resilient fabric material;

A still further object of the invention has been to devise cutter elements that can be effectively used for cutting symmetrical holes in a fabric material without generating appreciable heat, without tearing or damaging the material and generally, with minimized energy requirements, to quickly and effectively cut-out a circular hole of a desired diameter;

These and other objects will appear to those skilled in the art from the illustrated embodiment and the claims.

In the drawings, FIGURE 1 is a longitudinal side view to scale of a cutting tool or device constructed in accordance with the invention;

FIGURE 2 is a top plan view of the device on the scale of FIGURE 1 with cutter keys omitted for better illustration of the tool head;

FIGURE 3 is a fragmental longitudinal side view on the scale of FIGURE 1 but taken at substantially right angles thereto, along the line III—III;

FIGURE 4 is a somewhat diagrammatic fragmental plan view of a piece of belting material and showing the different sizes of holes that may be cut therein;

FIGURE 5 is an enlarged vertical section taken along the line V—V of FIGURE 4, showing belting material with its laminations and with a large size of hole cut therethrough, as effected by a cutting tool or device of the invention;

FIGURE 6 is a horizontal fragment showing details of the construction and mounting of a key-like cutter element; this view is on the same scale as and is taken along the line VI—VI of FIGURE 1; and FIGURE 7 is a perspective view on the scale of FIGURE 1 further illustrating the construction of each key-like cutter element.

The problem has been solved by providing at least a pair of diametrically-opposed and spaced-apart key-like cutter elements 25 of a novel shape and construction and mounting them to extend endwise-forwardly from a tool head 16 on opposite sides of a centrally-positioned, endwise-forwardly-extending twist drill guide stem or element 20 for circular movement with the drill stem that serves as a longitudinal axis for the rotative movement. The drill stem 20 has a greater forward extent to first enter and drill through the center of a circular disc or part that is to be cut-out or removed from belting material 10. The cutter elements 25, themselves, will thereafter engage the belting material 10 and start their cutting action. The tool assembly shown has a longitudinally-extending, solid cylindrical body, drive shaft or stem 15, a hexagonal wrench flat 15a at its back end, an enlarged circular head flange 15b at its forward end, and a central axial socket 15c for receiving and carrying the central guiding drill stem 20. A knurled head 16 is removably-secured on the head flange 15b and about the socket portion 15c and has at least two forwardly-open, diametrically-oppositely-positioned, keyway slot portions 16a for receiving a pair of the especially constructed key-like cutter elements 25.

It is preferable, in order to enable the tool to be used to cut, as desired, one of all three diameter sizes, indicated in FIGURE 4 as 16a, 16b and 16c, to provide four keyway slot portions of rectangular or polygonal section, represented by pairs of opposed slots 16a and 16'a. Each slot has a circumferentially-equally-spaced or quadrant location about the forward face of the tool head 16. The hexagonal wrench flat 15a of the shaft 15 is adapted to receive, for example, a 1¼" socket adaptor which will enable it to be connected to the operating shaft of reversible motor, such as a conventional impact motor (not shown).

In employing the cutting device, a wood board may be placed on the back side of a piece of belting 10 and the device then rotated, either clockwise or counterclockwise, by the impact motor to first drill a central guide hole through the belting. It has been determined that this is important in providing an accurate centering guide for the operation and in retaining the circular portion being cut in position until the actual cutting operation is fully accomplished by the key-like cutter elements 25. A pair of opposite key-like cutter elements 25 are removably-secured in a pair of opposed keyway slot portions 16a or 16'a in the head 16 of the tool to project endwise-forwardly thereof from the face of the head. The keyway slots are radially-spaced with respect to the central axis of the device or of the central drill element 20 carried thereby. Each keyway slot has at least a leading face provided with a slope that defines an angular relation with the longitudinal axis of the tool and the central drill element 20 that is a backward slope from the standpoint of the selected direction of rotation of the cutter 25, clockwise or counterclockwise. If the tool is to provide for both clockwise and counterclockwise rotation, then each keyway slot 16a and 16'a will have both its opposed leading or front and its trailing or back faces sloped to diverge upwardly-outwardly to accommodate backward tilt of an associated cutter 25 for each direction of tool head rotation.

As shown in the drawings, each key-like cutter element or insert 25 has a rectangular (polygonal) mounting shank or base 25a and a cutting blade extending longitudinally-axially forwardly thereof. The blade is defined by faces 25b, 25c, 25d, 25e and 25f. The faces 25b and 25c represent a pair of opposed wide side faces that are adapted to face diametrically or radially in their mounted relationships in the tool head 16. The faces 25d and 25e represent a pair of opposed leading or front and trailing or back narrow edge faces, and 25f represents a beveled or sloped knife face that extends between the narrow edge faces 25d and 25e and along the wide side faces 25b and 25c. The knife face 25f is shown formed on the wide side face 25b; it slopes forwardly with respect to the opposed wide side face 25c to define a surmounting, cross-extending knife edge 25g. As indicated, the knife edge 25g declines backwardly from an apex 25h at the leading edge or edge face 25d towards the trailing edge face or edge 25e and represents a forward end convergence of the wide side faces 25b and 25c, as accomplished by the beveled or forwardly-declining knife face 25f. A slight in-slope or inclination is provided transversely of wide side faces 25b and 25c that produces a slight planar convergence from the leading edge face 25d towards the trailing edge face 25e and thus, provides a blunter or slightly wider thickness of the leading edge face 25d. This convergence may be about 1° to 2° on each side face for a total of about 2° to 4°. It will be noted that the longitudinal extent of the blade, as represented by its side and edge faces, is about twice the thickness of the material 10 that is to be cut-out, and that the forward extent of the knife face 25f is about one-half the thickness of the material 10 to be cut-out.

It has been determined that a centrally-located top cutting apex representing an axiallly-pointed cutting end is not practical for the cutter elements 25, in that it produces a squeezing action on the material and greatly increases frictional resistance and heat. Using a pair of oppositely-positioned key-like cutting elements 25 of the present invention with an impact motor operating at 1800 r.p.m., a hole 10a can be smoothly cut through belting 10 in about thirty seconds and without raising the temperature of the cutting elements above a temperature at which a human finger would be burnt by touching them.

The cutting knife edge 25g that declines backwardly from the apex or highest corner 25h and between the leading edge face 25d and the trailing edge face 25e has a critical backwardly-declining angular relation b (see FIGURE 3) within a range of about 55° to 80°, with an optimum of about 60°. This angle represents the slope of the surmounting forward end cutting edge 25g in a circumferential or rotative direction, as measured from the longitudinal axis or center line of the cutter element 25. Also, a so-called lag angle a should be provided within a range of about 5° to 12°, with an optimum of 10°, in the sense of backward tilt of the leading edge side 25d of each key element 25 with respect to the longitudinal axis of the tool and of its central drill stem 20. The angular relation a provides a relief in depth to minimize friction and frictionally generated heat and resistance to rotation of the cutting elements 25. The angular relation b is essential in cleaning the belt material as the cutting operation proceeds; the angular relation a is essential to minimize friction and to provide a smooth concentric cutting action without shimmy, flutter or vibration of the impact motor. The backward sloped or following positioning of the cutter keys 25 with respect to the longitudinal axis of the central drill stem 20 produces improved results, but is not essential.

As shown in FIGURE 1, the knife face 25f of each key-like cutter element 25 has a side sloped or angular relationship between opposed wide side faces 25b and 25c, as represented by c, that is within a range of about 10 to 30° with respect to the longitudinal axis of the cutter element. An optimum angular relation for c is about 15°; this angular relation gives a relief in depth during the cutting operation and as employed with the use of a thicker wider or blunter leading edge cutting edge 25d, as compared to the trailing edge 25e. As illustrated in FIGURES 1 and 7, the opposed wide side faces 25b and 25c and the opposed leading and trailing faces 25d and 25e are planar; thus, as shown in FIGURE 6, each element 25 presents a polygonal section of planar sides, as distinguished from a curvilinear section conforming with the periphery of the tool head 16.

It will be noted that the radical positioning of the keyway pairs 16a and 16'a may be employed to provide different diameter cutting by the same set or pair of cutter keys 25. As shown in FIGURE 2, the keyways 16'a are located at a greater radial distance from the axial center of the tool or its knurled head 16 than the keyways 16a and will thus provide a larger size or diameter of hole than the set 16a, if the same set or pair of cutter keys 25 is used.

In employing four keyways in the too lhead 16, one pair or set of cutter keys may be used in one pair or set of keyways 16a for two different diameter sizes, by removing them from the keyways and reinserting them with their wide sides 25b and 25c reversed from their previous positioning. In this connection, the rotation of the cutter head 16 will be reversed, and a mounted backward tilt of the key-like cutter elements 25 is assured for both a forward and a reverse direction of movement by giving each keyway slot a backward-outward slope outwardly on both its opposed front and back faces. A third diameter of cut may be obtained by using the same pair of cutter elements 25 within the second set or pair of opposed keyway slots 16'a within which the cutter elements 25 may be tilted for either forward or reverse rotation. Also, a second pair of cutter elements 25 may be provided having a different offsetting of their cutting blades to provide a different diameter of cut for either forward or reverse tool rotation in, for example, the first set of keyway slots 16a. If a third set of keys 25 of the same general construction is provided, then three diameter sizes of holes can be drilled using one set of keyways 16a and the same direction of rotation.

The guide or pilot drill 20 shown in the drawings is a right hand bit, thus if the cutter elements 25 are set for counterclockwise cutting action in the head 16, the tool should be first rotated clockwise until the drill 20 is through the belt; at this time, the tool may then be reversed for counterclockwise operation during which the cutter elements 25 will engage and then bore-out a hole 10a in the belting material 10. On the other hand, if a left-hand drill 20 is substituted and used, then the tool may be rotated counterclockwise throughout its entire operation for both the drilling of the guide or pilot hole in the material and the cutting-out of the full size hole 10a therein by the cutter elements 25.

The 55° to 80° angular range of b is critically important, as below 55° there is a driving-tearing rather than a cutting action of the key elements 25 and above 80° there is a jack-hammering or fluttering rotating action. The use of a leading edge 25d that is thicker or more blunt than the trailing edge 25e is important to provide a relief in depth action in the fabric material 10 that is being cut. The belt hole cutter device has greatly speeded-up and simplified the cutting of holes of suitable size by the workmen in a fabric belt. It eliminates hammering and other complicated procedures, such that tail pieces can be completely made from a piece of conveyor belting with a saving of two hours per section.

For removably-securing the cutting keys 25 in their keyways, Allen head set screws 18 and 18' are shown threadably-mounted to extend radially through the wall of the head 16. Set screw 17 extends through the wall of the socket portion 15c to removably-secure the drill element 20 therein, and set screw 19 extends transversely or radially through the head 16 to removably-secure it on the flange 15b and about the socket 15c.

Although a preferred apparatus embodiment of the invention has been shown and described, it will be apparent to those skilled in the art that various changes, omissions and additions may be made in such embodiment without departing from the spirit and scope of the invention as indicated by the claims.

I claim:

1. In a rotary hole cutting-out tool suitable for a heavy fabric material such as a thickness of belting, a longitudinally-backwardly extending tool drive stem surmounted by an enlarged head, a guide drill stem centrally-mounted on said head to project endwise-forwardly thereof along the longitudinal axis of said drive stem, a pair of key-like cutter elements each having a mounting shank of polygonal section and a cutting blade extending longitudinally-forwardly of said shank, a pair of keyway slot portions in a peripherally spaced-apart relation along and in a diametrically-opposed relation within and open to a forward face of said head for receiving the shank of an associated one of said cutter elements therein, means removably-securing the shanks of said cutter elements within an associated one of said keyway slot portions to project longitudinally-endwise-forwardly thereof in a substantially equally-radially-outwardly spaced relation with respect to said drill stem, the cutting blade of each of said cutter elements having a body provided with a pair of opposed planar wide side faces and a pair of opposed planar leading and trailing narrower faces, a planar knife face at a forward end of said blade sloping forwardly between said leading and trailing narrower faces from one wide side face towards the opposite wide side face, said planar knife face being surmounted by a knife edge that extends from a forward apex at said leading face in a backwardly-declining relation along said knife face to said trailing face, said knife edge defining an angular relation with respect to the longitudinal axis of said cutter element of about 55° to 80°, and said knife face defining an angular relation with respect to the longitudinal axis of said cutter element between said opposed wide side faces of about 10° to 30°, and said planar leading face being of thicker section than said planar trailing face with said wide side faces converging from said leading face towards said trailing face.

2. In a rotary hole cutting-out tool as defined in claim 1, said knife edge being defined between said planar knife face and said opposite wide side face and lying immediately along said opposite wide side face.

3. In a rotary hole cutting-out tool as defined in claim 2, said convergence of said wide side faces being within a total of 2° to 4°.

4. In a rotary hole cutting-out tool as defined in claim 2, each of said cutter elements having its shank mounted in a backwardly-tilted relation within an associated keyway slot portion with respect to the apex of its cutting edge that defines an angle of about 5° to 12° with the longitudinal axis of the tool.

5. In a rotary cutting-out tool as defined in claim 4, threaded screws extending transversely from an outer side of said head into each of said slot portions to engage the shank of an associated cutter element positioned therein for securely mounting said cutter elements therein, a central socket portion extending longitudinally-forwardly of said head and adapted to receive a back end of said drill stem therein, and adjustable screw means extending through a side wall of said socket to securely mount said drill stem therein.

References Cited

UNITED STATES PATENTS

| 359,296 | 3/1887 | Tower | 77—69 |
| 1,436,974 | 11/1922 | Michalczyk | 77—69 |
| 2,406,442 | 8/1946 | Smith | 77—79 |
| 2,435,648 | 2/1948 | Frevel | 144—23 XR |

FOREIGN PATENTS

| 228,653 | 2/1925 | Great Britain. |

FRANCIS S. HUSAR, Primary Examiner

U.S. Cl. X.R.

145—121

UNITED STATES PATENT OFFICE
CERTIFICATE OF CORRECTION

Patent No. 3,504,577          Dated April 7, 1970

Inventor(s) Joseph A. Parenti

It is certified that error appears in the above-identified patent and that said Letters Patent are hereby corrected as shown below:

Column 4, line 49, change "radical" to --radial--; line 58, change "too lhead" to --tool head--.

Column 5, lines 56 and 57, correct the spelling of "diametrically".

SIGNED AND
SEALED

JUL 28 1970

(SEAL)
Attest:

Edward M. Fletcher, Jr.
Attesting Officer

WILLIAM E. SCHUYLER, JR.
Commissioner of Patents